US006824139B2

(12) United States Patent
Barinaga et al.

(10) Patent No.: US 6,824,139 B2
(45) Date of Patent: Nov. 30, 2004

(54) OVERMOLDED ELASTOMERIC DIAPHRAGM PUMP FOR PRESSURIZATION IN INKJET PRINTING SYSTEMS

(75) Inventors: Louis C. Barinaga, Salem, OR (US); Dan D. Dowell, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 10/050,220

(22) Filed: Jan. 16, 2002

(65) Prior Publication Data

US 2002/0057972 A1 May 16, 2002

Related U.S. Application Data

(63) Continuation-in-part of application No. 09/662,693, filed on Sep. 15, 2000.

(51) Int. Cl.[7] .................................................. F16J 3/00

(52) U.S. Cl. ....................... 277/628; 277/634; 277/635; 347/85

(58) Field of Search ................................ 277/628, 634, 277/635; 347/85, 86, 87

(56) References Cited

U.S. PATENT DOCUMENTS

| | | | | |
|---|---|---|---|---|
| 2,918,089 A | * | 12/1959 | McFarland | 251/331 |
| 5,784,087 A | * | 7/1998 | Wallace et al. | 347/85 |
| 5,854,646 A | * | 12/1998 | Barinaga et al. | 347/85 |
| 6,305,793 B1 | * | 10/2001 | Haines | 347/85 |
| 6,350,024 B2 | * | 2/2002 | Haines | 347/85 |

* cited by examiner

*Primary Examiner*—Anthony Knight
*Assistant Examiner*—Enoch Peavey

(57) ABSTRACT

An overmolded diaphragm pump for applying pumping force to a fluid such as liquid ink for ink-jet printing. The pump structure includes a rigid substrate having at least one chamber opening, and an elastomeric diaphragm and sealing structure fabricated of an elastomeric material. This diaphragm and sealing structure is overmolded over a portion of the rigid substrate and includes at least one diaphragm portion extending over a corresponding chamber opening. A gland seal portion makes a seal between the elastomeric diaphragm and sealing structure and a mating part.

37 Claims, 6 Drawing Sheets

FIG. 1
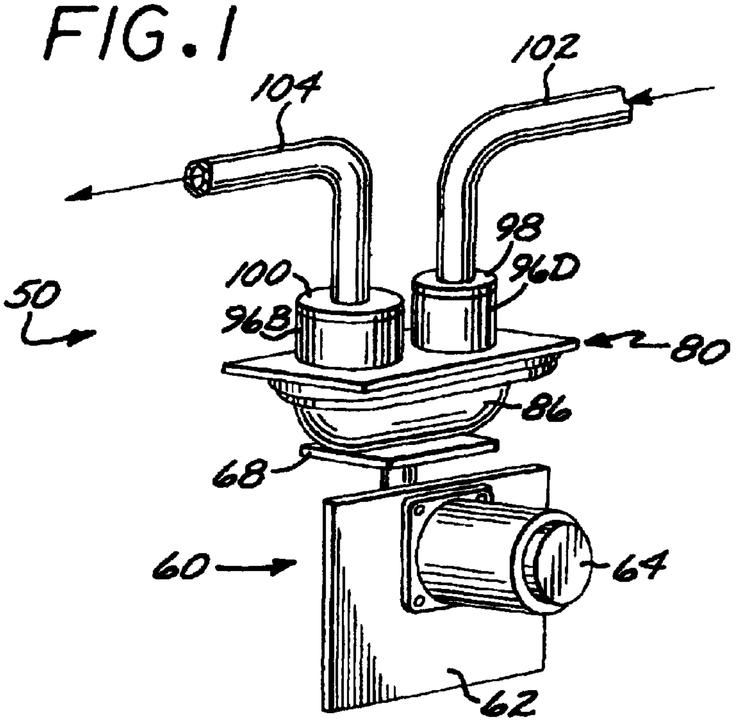
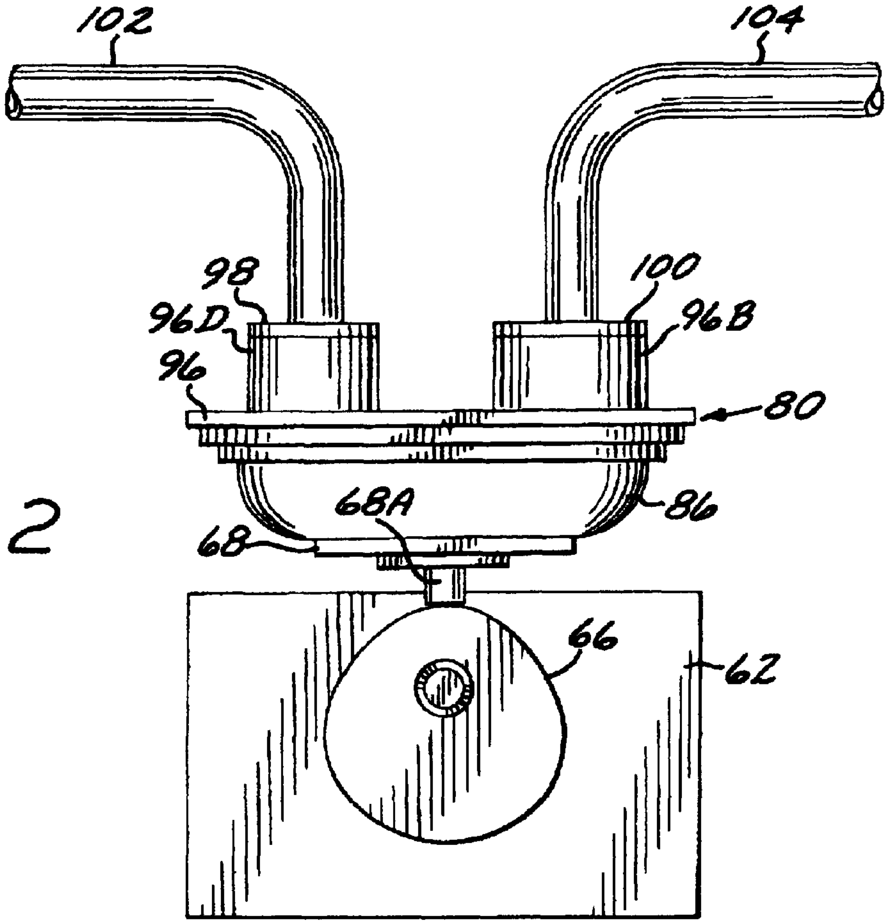
FIG. 2

OVERMOLDED ELASTOMERIC DIAPHRAGM PUMP FOR PRESSURIZATION IN INKJET PRINTING SYSTEMS

CROSS-REFERENCE TO RELATED APPLICATION

This is a continuation-in-part of commonly-assigned application Ser. No. 09/662,693, filed Sep. 15, 2000, OVERMOLDED GLAND SEAL, by Louis Barinaga, Daniel D. Dowell and James P. Kearns, the entire contents of which are incorporated herein by this reference.

TECHNICAL FIELD OF THE DISCLOSURE

This invention relates to pumps for pumping a liquid, such as ink in inkjet printing systems.

BACKGROUND OF THE DISCLOSURE

In order to supply pressurized ink for ink-jet printing systems, a diaphragm style elastomer pump has been used in the ink supply for supplying ink to a printhead. The pump included a molded elastomeric membrane that was placed below a rigid chamber. The perimeter of the membrane was placed against the brim of a pump chamber. The membrane was held in place with a crimp sleeve that ran along the perimeter of the membrane. The crimp sleeve was crushed to force the membrane against the chamber brim.

SUMMARY OF THE DISCLOSURE

An overmolded diaphragm pump is described for applying pumping force to a liquid. The pump structure includes a rigid substrate having at least one chamber opening, and an elastomeric diaphragm and sealing structure fabricated of an elastomeric material. This diaphragm and sealing structure is overmolded over a portion of the rigid substrate and includes at least one diaphragm portion extending over a corresponding chamber opening. A gland seal portion makes a seal between the elastomeric diaphragm and sealing structure and a mating part.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is an isometric view of an overmolded diaphragm pump in accordance with aspects of this invention.

FIG. 2 is a plan view of the pump of FIG. 1.

DETAILED DESCRIPTION OF THE DISCLOSURE

Figure 3:
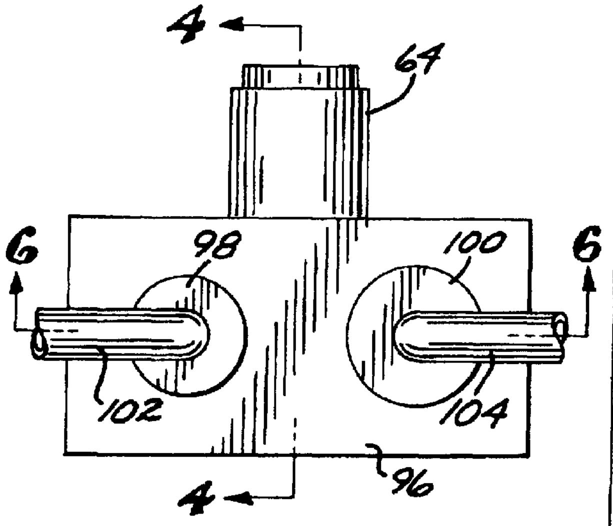
FIG. 3 is a top view of the pump of FIG. 1.

An embodiment of a diaphragm pump assembly 50 embodying aspects of the invention is shown in FIGS. 1–8C. Referring first to FIGS. 1–3, the pump assembly includes a pump actuator 60 and a diaphragm chamber structure 80. For this embodiment, the pump has an inlet connected to conduit 102, and an output connected to conduit 104. The pump actuator includes a support bracket 62 to which is mounted a motor 64. The motor turns an eccentric cam 66 on its shaft, which engages an end of pin 68A, thus moving the plate 68 into and out of engagement with the chamber structure 80. For clarity, some support structure is omitted from FIG. 1, such as supporting bracketry or bushings which constrain the movement of the pin 68A along an axial path.

It will be appreciated that there are many other types of actuator structures that could be employed to actuate the pump, e.g. solenoids, levers or rocker arms.

In general, the invention can be employed in fluid delivery systems, including gas and liquid delivery systems. An exemplary application to which this invention is well suited is that of an inkjet printing system, wherein the pump assembly is employed to pump liquid ink. The pump assembly can be integrated into ink supplies, inkjet print cartridges or printers, for example.

The chamber structure 80 includes a membrane structure 82 (FIG. 5), comprising a first unitary rigid plastic frame element or substrate 84 that is overmolded with a second unitary structure 86 fabricated of a second material (elastomer in this embodiment) to create the pump geometry. In this embodiment, the second unitary structure 86 also creates an overmolded gland seal portion 86A for sealing to a mating part 96. The rigid substrate 84 is fabricated of liquid crystal polymer (LCP) or Polyphenylene Sulfide (PPS) in an exemplary embodiment, available, e.g., from Ticona, Summit, N.J. The structure 84 is formed with features such as castellations 84A (FIG. 7A) allowing for the overmolding of the structure 86 onto the rigid structure 84 forming an elastomeric pump membrane 86 and glandular seal 86A onto the rigid structure 84.

The rigid substrate 84 acts as the host part to which the elastomer 86 is overmolded. When the chamber structure 80 is mated with a structure such as a pump body 96 (FIG. 5), the rigid substrate provides structural support opposing collapse of the elastomer 86 and gland seal 86A, forming a clearance fit with the mating part, so that the elastomeric gland seal is compressed. Also, elastomeric parts are difficult to handle during manufacturing processes, and the rigid part can also function as a sort of carrier to enable the parts to be handled more easily.

Figure 6:
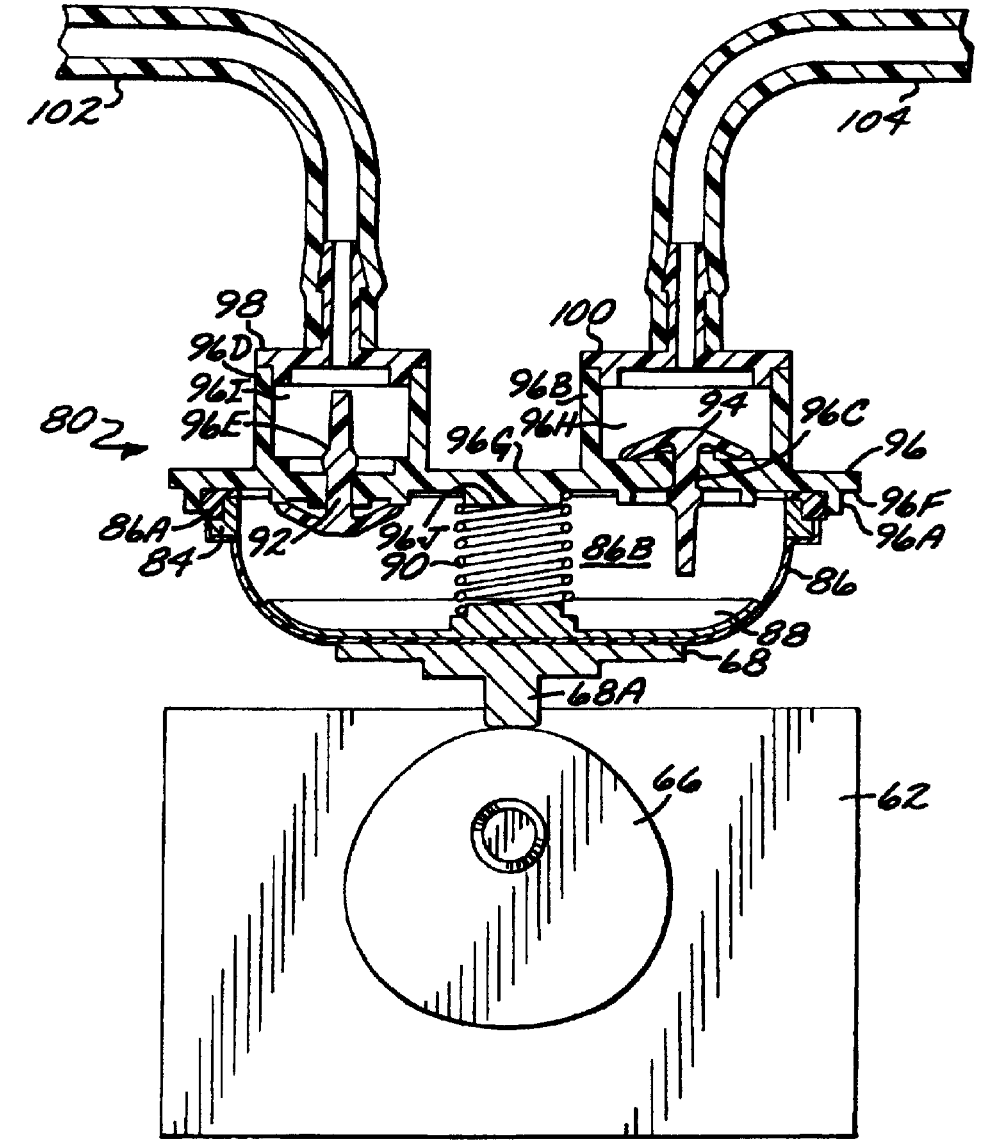
FIG. 6 is a cross-sectional view of the pump structure, taken along line 6—6 of FIG. 3.
Figure 7A:
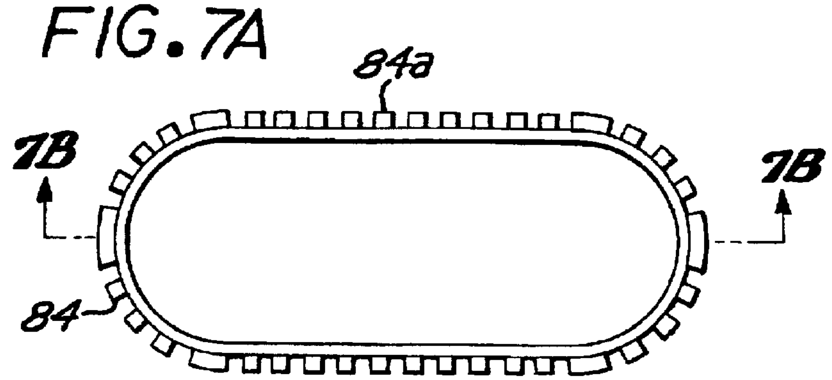
FIG. 7A is a top view of the rigid frame substrate comprising the pump.
Figure 7B:
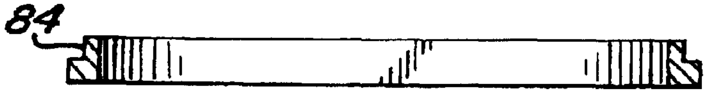
FIG. 7B is a cross-sectional view of the frame substrate, taken along line 7B—7B of FIG. 7A.

The mating part 96 is a pump body fabricated of a rigid plastic material, and includes a peripheral boss 96A protruding from a lower surface 96F (FIG. 6). The boss circumscribes the pump chamber 86B (FIG. 6). The boss is arranged to engage with the gland seal 86A of the membrane 86. The pump body 96 has cylindrical towers 96B, 96D protruding upwardly from upper surface 96G to define valve cavities 96H, 96I, respectively. The cavities communicate with the diaphragm pump cavity 86B through openings 96C, 96E respectively. Umbrella valves 92, 94 are passed through these openings to permit one way fluid flow, with valve 92 the inlet valve permitting fluid to flow into the cavity 86B when the valve break pressure is exceeded, and valve 94 the outlet valve permitting fluid to flow out of the cavity 86B when its valve break pressure is exceeded. Valve 92 prevents fluid from passing from the pump chamber 86B to the inlet 102. Valve 94 prevents fluid from passing from the outlet 104 into the chamber 86B. Other types of structures could be employed in place of the umbrella valves, such as ball-spring, duck-bill or flapper film check valves. Caps 98, 100 are sealed to the tops of the towers 96D, 96B, respectively, and include barb fittings in this embodiment to interconnect to tubes 102, 104. In other embodiments, the inlet and outlets of the pump can be directly connected to fluid channels formed in a host assembly, such as an ink container or print cartridge.

The pump assembly 50 further includes a plate 88, fabricated of a rigid material such as injection molded plastic, and a spring 90. As shown in FIG. 6, the spring and plate are disposed in cavity 86B, the spring 90 disposed between a boss 96J protruding from the lower surface 96F and the plate 88. The spring 90 biases the membrane 86 to the rest position shown in FIG. 6, and upon actuation by actuator 60, compresses to collapse the cavity 86B, forcing fluid in the cavity out through valve 94. The plate protects the membrane from damage, and provides a structural bottom element to the bottom side of the cavity 86B, tending to maintain the dome shape of the cavity when the spring is not compressed.

The pump 50 thus includes a thin elastomer membrane 86, domed in this exemplary embodiment, which serves as the pump diaphragm. The membrane is integrally formed with an overmolded gland seal structure 86A to make a hermetic joint with the mating part 96. Suitable materials for fabricating the membrane 86 include silicone rubber or EPDM rubber, with a durometer 70 Shore A. In this exemplary embodiment, the diaphragm thickness is 0.35 mm, and the diameter of the gland seal is 1.3 mm, with a 29% diametral compression.

Figure 4:
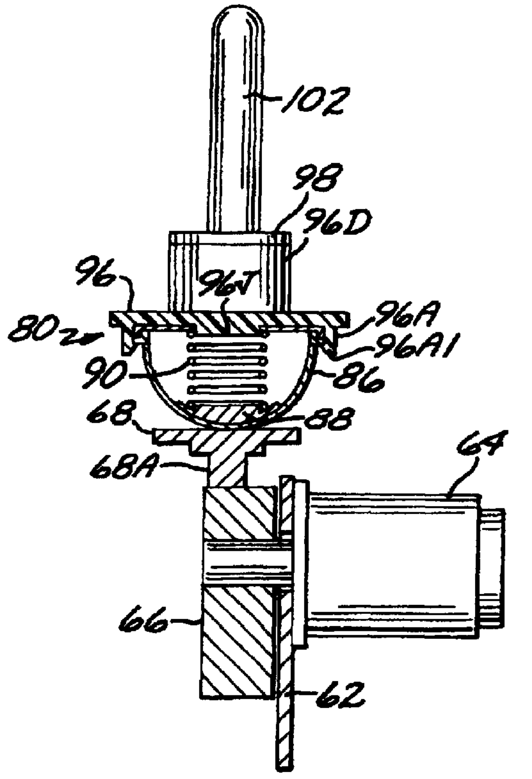
FIG. 4 is a side cross-sectional view of the pump, taken along line 4—4 of FIG. 3.

The structure 82 is held in place against mating part 96 by conventional techniques such as by use of screws, latches, snap fitting, crimping or the like. For example, a cantilevered lip portion 96A1 is depicted in FIG. 4 to provide a snap fit. The lip portion can be provided only on opposite sides of the chamber, positioned about the perimeter of the chamber, or even provided as a continuous structure about the periphery of the chamber. These techniques can provide a simple mechanical attachment function, since they are not required to provide hermetic sealing, as that is provided by the gland seal arrangement.

Over-molding is a well known, two step fabrication process, in which a rigid substrate, e.g. frame 84 (FIGS. 7A–7B) is first formed, typically by injection molding. Thereafter, in a second step, a layer of elastomer 86 is molded onto the substrate, typically by thermoset or thermoplastic injection molding, forming membrane structure 82. The resulting structure is illustrated in further detail in FIGS. 8A–8C.

Figure 8A:
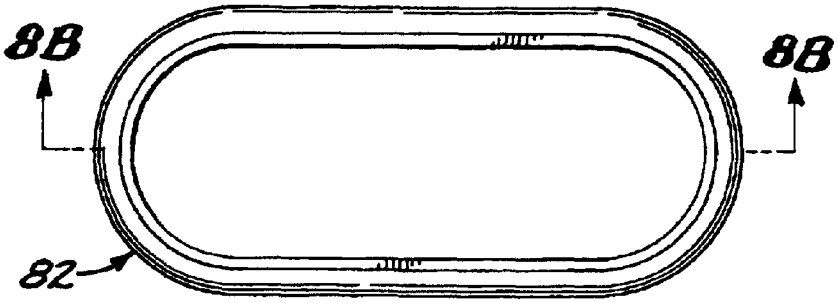
FIG. 8A is a top view of the membrane and rigid substrate structure comprising the pump.
Figure 8B:
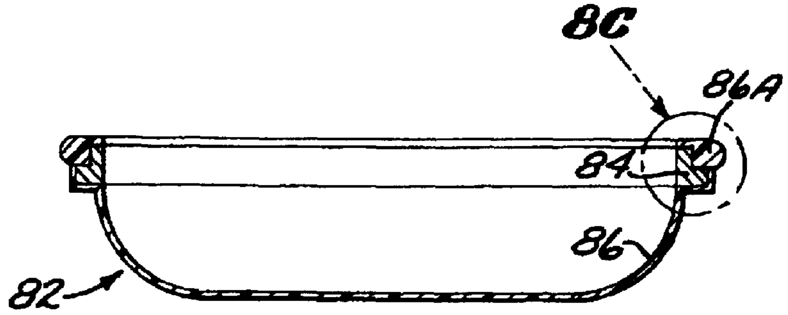
FIG. 8B is a cross-sectional view, taken along line 8B—8B of FIG. 8A.
Figure 8C:
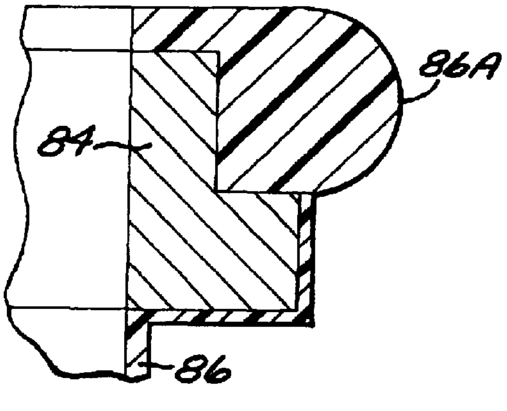
FIG. 8C is an enlarged view of the area indicated by phantom circle 8C in FIG. 8B.

FIG. 8A is a bottom view of the structure 82, with FIG. 8B a cross-sectional view taken along line 8B—8B. FIG. 8C is an enlarged partial view of the area indicated in FIG. 8B, showing the gland seal 86A in further detail.

Two over-molding methods are commonly used. The first is used for overmolding onto rigid thermoplastics. In this process, a rigid thermoplastic piece, e.g. the substrate 84, is molded. A thermoplastic elastomer 86 is then overmolded after a section of movable coring is retracted. The thermoplastic part may be required to endure high mold temperatures during the second step of this process.

The second method of overmolding is used to overmold thermoset elastomer onto either a rigid thermoset or thermoplastic piece. In this process, a rigid thermoplastic piece (e.g. substrate 84) is molded using traditional injection molding techniques. The part is then transferred to a second mold cavity wherein the thermoset elastomer is injected onto it. Again, the rigid piece may endure high mold temperatures during the overmold process.

The pump works in the following manner. Pressing the membrane inwardly, by the actuator 60, causes a positive pressure to build in the chamber 86B, creating the fluid motion, exiting the chamber through the valve 94; the valve 92 remains closed. When the actuator withdraws, the spring 90 forces plate 88 down, causing valve 94 to close and a negative pressure to build, until valve 92 opens, and fluid is drawn through valve 92 to fill the chamber 86B. The pump is now ready for a new pump cycle.

Figure 9:
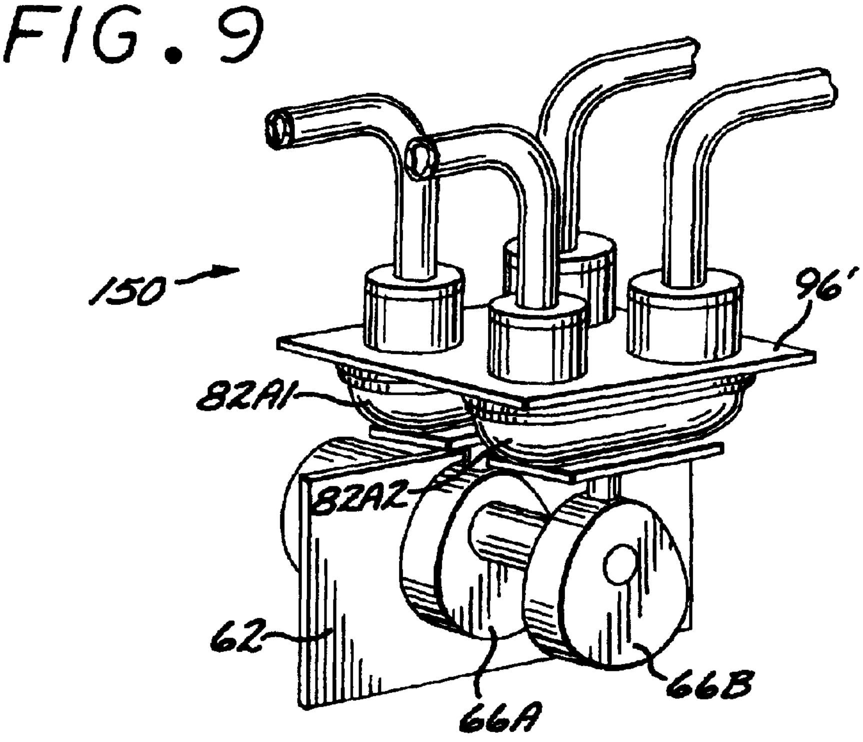
FIG. 9 illustrates an example of a multi-up configuration pump, wherein two individual pump structures are assembled in a side-by-side arrangement onto a single unitary pump body structure.

This style of overmolded pump can be used in a single diaphragm pump configuration, or in multi-up configurations, i.e. wherein more than one diaphragm pump structure is formed on a single substrate. FIG. 9 illustrates an example of a multi-up configuration pump 150, wherein two individual pump structures 82A1, 82A2 are assembled in a side-by-side arrangement onto a single unitary pump body structure 96'. In this exemplary multi-up configuration, the pumps are identical in size, with respective elastomeric chamber structures 82A1, 82A2 for the respective pumps, and two actuator cams 66A, 66B mounted on a single motor shaft for actuation by a single motor mounted to plate 62. The internal aspects of the two pumps are the same as described above regarding FIGS. 1–8C.

Figure 10:
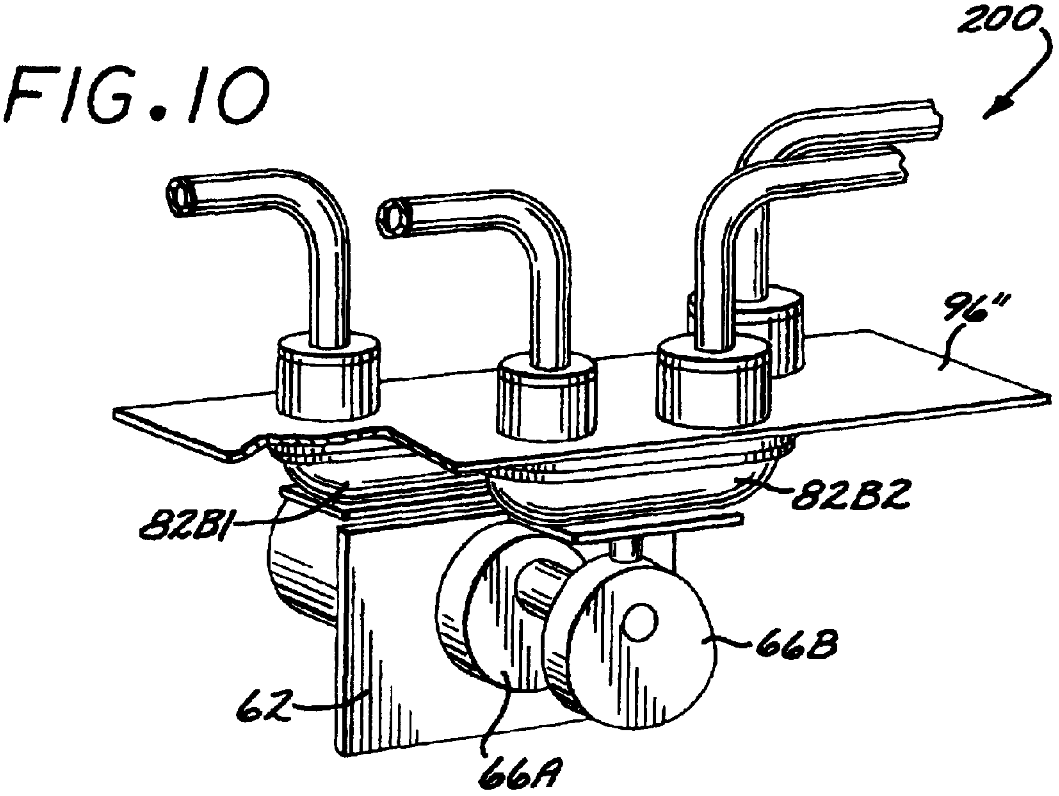
FIG. 10 shows a multi-up pump configuration, wherein two individual pump structures are assembled onto a single pump body structure in a side-by-side arrangement, and wherein the two pumps structures have different aspect ratios.

While the embodiment of FIG. 9 provides pump chambers of identical configuration, this is not a requirement, and multi-up configurations can utilize pumps with different aspect ratios, i.e. the ratio of length and width. This invention allows for pumps with extreme aspect ratios to be created. FIG. 10 shows a multi-up pump configuration 200, wherein two individual pump structures 82B1, 82B2 are assembled using a single pump body structure 96" in a side-by-side arrangement, and wherein the two pumps have different aspect ratios. This is illustrated by the two elastomeric diaphragm chamber structures 82B1, 82B2, wherein structure 82B1 is longer than structure 82B2. Here again, the internal structure of the two pumps is similar to that illustrated in FIGS. 5–6 for pump 50, except that the pump elements are scaled to provide the longer dimension. Different pump sizes provide the capability of pumping different volumes of ink or different flow rates.

Figure 12:
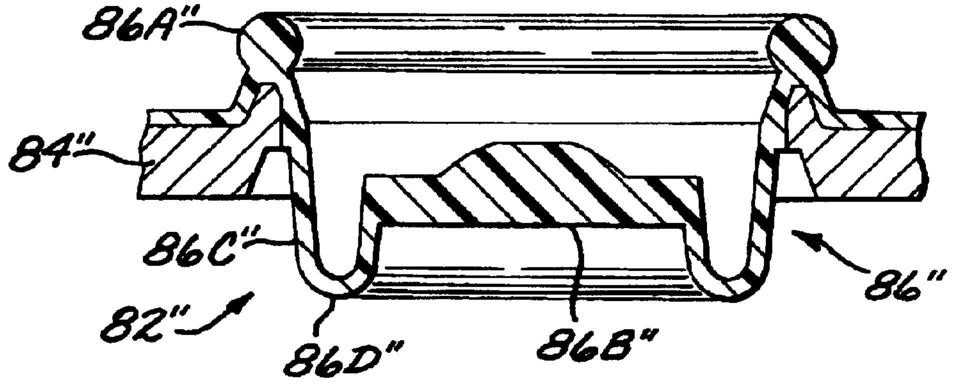
FIG. 12 shows a further alternate embodiment of the elastomeric structure, a rolling convolute configuration.

Aspects of the invention provide several other advantages, depending on the particular implementation. One possible advantage is that pumps can be fabricated of various irregular shapes, shapes that are not possible with a crimp sleeve design. Moreover, unlike a crimp sleeve design, the overmolded pump structure does not require a flat sealing surface. Because of this, a three-dimensional sealing surface could be used, an example of which is shown in FIG. 12 in the referenced patent application Ser. No. 09/662,693.

A further potential advantage is a direct material cost reduction. A single overmolded part will, in most cases, cost less than the sum of the individual costs of the components. Overhead expenses associated with the manufacturing and handling of each of the components can add to be larger than the cost increase due to mold complexity.

Because the pumps are created using a mold process, tighter tolerances can be achieved on the position of the pump surfaces. Assembly tolerances from pump loading and placement are eliminated. Because the pump surfaces and sealing surfaces are created by the mold, their positions are not affected by variation in the host part. This consistency also removes tolerances from the overall tolerance stack.

Figure 11:
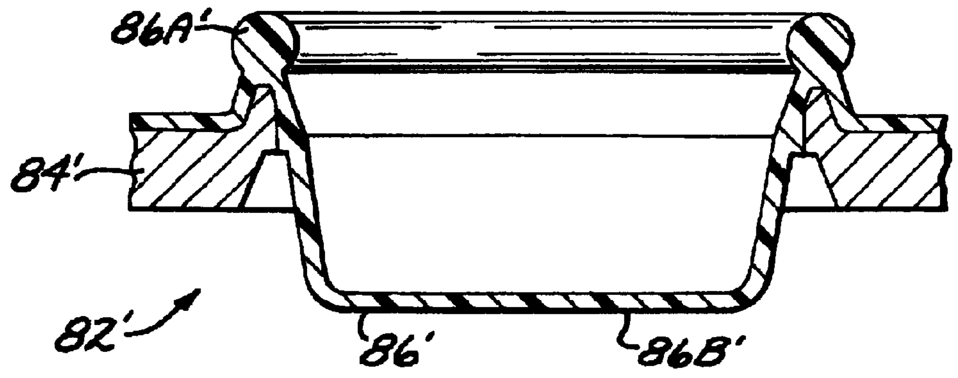
FIG. 11 illustrates an alternate embodiment of the elastomeric member, a "top hat" elastomeric chamber configuration.

While the elastomeric diaphragm chamber structures 82, 82A1, 82B1, 82A2 and 82B2 have employed a dome shape, it is to be appreciated that other shapes could alternatively be employed. For example, FIG. 11 illustrates a "top hat" configuration 82', wherein the elastomeric member 86' is overmolded on a rigid frame 84', defining a gland seal portion 86A'. The elastomeric structure 86' includes a substantially flat chamber wall region 86B' which is collapsible by actuation of the pump actuator. FIG. 12 shows a further alternate embodiment, that of a rolling convolute configuration 82', wherein the elastomeric member 86" is overmolded on a rigid frame 84", defining a gland seal portion 86A". The elastomeric structure 86" includes a substantially flat chamber wall region 86B' and relatively long sidewall portion 86C" which connects to the flat central portion 86B" at a rolling hinge portion 86D". The structure 86" is collapsible by actuation of the pump actuator.

Figure 13:
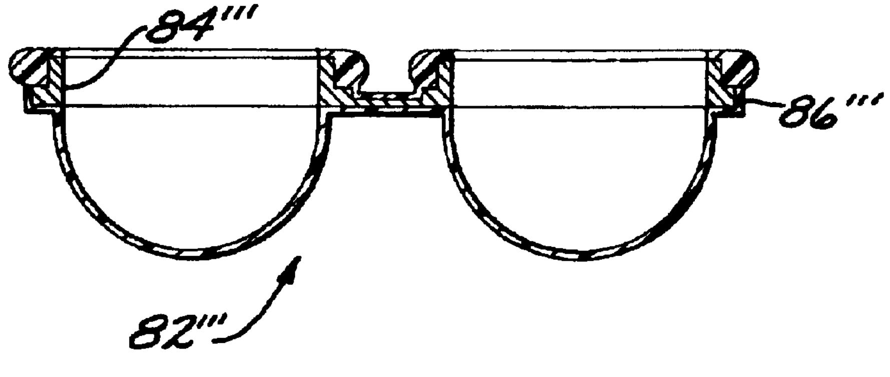
FIG. 13 illustrates in cross-section yet another alternate embodiment of an elastomeric pump structure.

For a multiple pump configuration, the multiple pumps can be assembled to a single body part such as part 96' of FIG. 9. Instead of employing separate diaphragm structures as in FIG. 9, the elastomeric diaphragm structures can be molded onto a unitary rigid substrate which has separate chamber openings defined therein. For example, the substrates 84' and 84" can be extended to provide multiple chamber openings, for overmolding a unitary elastomeric structure defining a plurality of elastomeric chambers and gland seals structures. FIG. 13 illustrates a dual pump structure 86'" fabricated on a unitary rigid substrate 84'". A unitary elastomeric structure is overmolded 86'" is overmolded onto the substrate 84'", creating dual elastomeric chamber and gland seal structures. The structure 82'" can then be assembled to a unitary pump body structure such as structure 96' (FIG. 9) to create the dual pump assembly.

Figure 5:
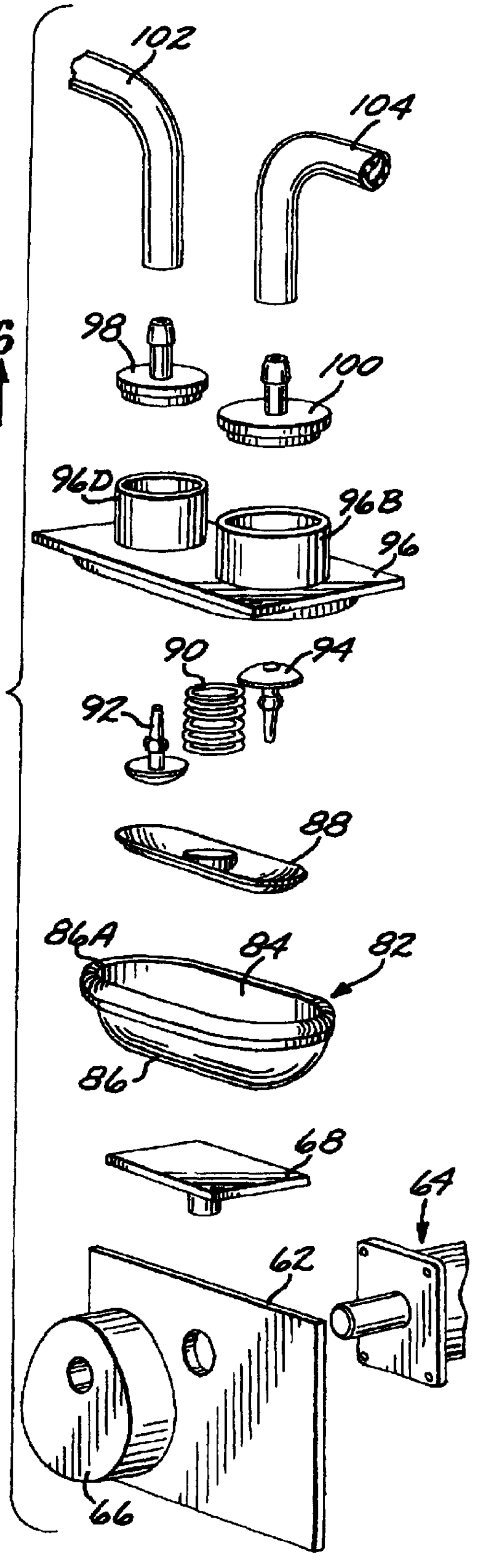
FIG. 5 is an exploded view of the pump structure of FIG. 1.

A further multi-up configuration is that in which a unitary elastomeric structure defining a plurality of chamber and gland seal structures, such as structure 82'" of FIG. 13, is assembled to a plurality of separate body structures, for example, such as structure 96 (FIG. 5).

While the multi-up structure 82'" employs the same elastomeric material for each elastomeric pump structure, alternatively different elastomeric materials can be employed for one or more pump structures. This could accommodate different inks in an inkjet printing system which might react with one type of elastomer but not another, for example, or to provide a high use chamber with a more durable material than another chamber, or to use a material providing a higher barrier to water or vapor transmission for one pump than the material used for another pump of a ganged system.

Ganging the pump parts can reduce part count and reduce cost. Another possible advantage is the relatively high pump packing density, since the pump structure does not require crimping, and so is not constrained by clearance issues for a crimp tool. Multiple pumps can be placed close together to enable smaller assembly sizes. Another possible advantage is the ease of assembly, since the pump can be pressed or snapped onto a mating part. The seal to the mating part is independent of the mechanical attachment method. Another possible advantage is that a secondary assembly process can be avoided, since a preferred embodiment does not require secondary processes such as crimping. When the pump is snapped onto the part, the seal is automatically made.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An overmolded diaphragm pump for applying pumping force to a fluid, comprising:

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and a mating part.

2. The pump of claim 1 wherein the diaphragm portion is a dome-like structure.

3. The pump of claim 1 wherein said seal portion comprises an overmolded gland seal portion for mating with a raised boss of the mating part.

4. The pump of claim 1 wherein the seal portion includes a circular gland.

5. The pump of claim 1, further comprising a pump actuator for mechanically actuating the elastomeric diaphragm and sealing structure.

6. The pump of claim 5, wherein said pump actuator includes a motorized cam actuator.

7. The pump of claim 1, further comprising a bias spring disposed within the chamber for biasing the elastomeric diaphragm portion to a rest position.

8. The pump of claim 7, further comprising a plate member disposed in said cavity between an end of the spring and the elastomeric diaphragm.

9. The pump of claim 1, wherein the fluid is liquid ink used in an inkjet printing system.

10. The pump of claim 1, wherein said elastomeric material is silicone rubber or EPDM rubber.

11. An overmolded diaphragm pump for applying pumping force to a fluid, comprising:

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and a mating part, wherein the diaphragm portion has a rolling convolute configuration, with a central portion and a wall portion joined by a rolling hinge portion.

12. An overmolded diaphragm pump for applying pumping force to a fluid, comprising:

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and a mating part, wherein the diaphragm portion has a central flat portion joined to a collapsible wall portion.

13. An overmolded diaphragm pump for applying pumping force to a fluid, comprising:

a pump body structure;

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and said pump body structure.

14. The pump of claim 13 wherein the diaphragm portion is a dome-like structure.

15. The pump of claim 13 wherein said seal portion comprises an overmolded gland seal portion for mating with a raised boss of the pump body structure.

16. The pump of claim 13, wherein the pump body structure includes a chamber surface, said raised boss protruding from the chamber surface.

17. The pump of claim 16, wherein said raised boss circumscribes a periphery of the pump chamber.

18. The pump of claim 13 wherein the seal portion includes a circular gland.

19. The pump of claim 13, wherein the pump body structure includes a fluid inlet port in fluid communication with said cavity, and a fluid outlet port in fluid communication with said cavity.

20. The pump of claim 19, further comprising an inlet valve permitting fluid flow into said cavity from the fluid inlet port and preventing fluid flow from said cavity into the fluid inlet port, and an outlet valve permitting fluid flow from said cavity into the outlet port and preventing fluid flow from said outlet port into said cavity.

21. The pump of claim 20, wherein said inlet valve permits fluid flow into said cavity from the fluid inlet port when an inlet valve break pressure is exceeded, and said outlet valve permits fluid flow from said cavity into the outlet port when an outlet valve break pressure is exceeded.

22. The pump of claim 13, further comprising a pump actuator for mechanically actuating the elastomeric diaphragm and sealing structure.

23. The pump of claim 22, wherein said pump actuator includes a motorized cam actuator.

24. The pump of claim 13, further comprising a bias spring disposed within the chamber for biasing the elastomeric diaphragm portion to a rest position.

25. The pump of claim 24, further comprising a plate member disposed in said cavity between an end of the spring and the elastomeric diaphragm.

26. The pump of claim 13, wherein the fluid is liquid ink used in an inkjet printing system.

27. The pump of claim 13, wherein said elastomeric material is silicone rubber or EPDM rubber.

28. An overmolded diaphragm pump for applying pumping force to a fluid, comprising:

a pump body structure;

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and said pump body structure, wherein the diaphragm portion has a rolling convolute configuration, with a central portion and a wall portion joined by a rolling hinge portion.

29. An overmolded diaphragm pump for applying pumping force to a fluid, comprising:

a pump body structure;

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and said pump body structure, wherein the diaphragm portion has a central flat portion joined to a collapsible wall portion.

30. An overmolded diaphragm pump for applying pumping force to a fluid, comprising:

a pump body structure;

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a pump chamber, and a seal portion for making a seal between the elastomeric diaphragm and sealing structure and said pump body structure, said sealing portion comprising an overmolded gland seal portion for mating with a raised boss of the pump body structure;

and wherein the pump body structure includes a chamber surface, said raised boss protruding from the chamber surface and circumscribing a periphery of the pump chamber, wherein said gland seal portion engages against said chamber surface and an interior surface of said boss.

31. A multi-chambered overmolded diaphragm pump system for applying pumping force to a fluid, comprising:

a rigid substrate having a plurality of chamber openings;

an elastomeric diaphragm and sealing structure fabricated of an elastomeric material, said diaphragm and sealing structure overmolded over at least a portion of the rigid substrate and including a corresponding plurality of diaphragm portions each extending over a corresponding one of said plurality of chamber openings and a plurality of seal portions each for making a seal between the elastomeric diaphragm and sealing structure and a mating part.

32. The pump system of claim 31 wherein each said seal portion comprises an overmolded gland seal portion.

33. A multi-chambered overmolded diaphragm pump system for applying pumping force to a fluid, comprising:

a pump body structure including a plurality of sets of inlet and outlet chamber valves, each set for a corresponding pump chamber;

a plurality of diaphragm chamber structures, each including:

a rigid substrate having a chamber opening defined therein;

an elastomeric diaphragm and sealing structure fabricated of an elastomeric material, said diaphragm and sealing structure overmolded over at least a portion of the rigid substrate and including a diaphragm portion and a seal portion for making a seal between the elastomeric diaphragm and sealing structure and a surface of said pump body structure; and wherein each of said plurality of diaphragm chamber structures is assembled to said pump body structure with a sealing fit between each said surface and each said seal portion.

34. The pump system of claim 33 wherein said body structure comprises a plurality of raised bosses circumscribing the pump chambers, and each of said seal portion comprises an overmolded gland seal portion for mating with a corresponding one of said plurality of raised bosses.

35. The pump of claim 33 wherein the seal portion includes a plurality of circular glands each for press fitting into a corresponding channel formed on a mating part.

36. A diaphragm pump system for pumping a fluid, comprising:

a pump body structure including a fluid inlet, a fluid outlet, a fluid inlet valve and a fluid outlet valve, the pump body structure including a wall circumscribing a pump chamber periphery;

a rigid substrate having a chamber opening defined therein;

an elastomeric diaphragm and sealing structure fabricated of an elastomeric material, said diaphragm and sealing structure overmolded over at least a portion of the rigid substrate and including at least one diaphragm portion extending over said chamber opening and defining a collapsible pump chamber wall, and a seal portion for making a seal between the elastomeric diaphragm and sealing structure and said wall of said pump body structure; and a pump actuator for contacting the pump chamber wall to collapse the wall.

37. The pump of claim 36 wherein said seal portion comprises an overmolded gland seal portion for mating with said wall of said body structure.

* * * * *